United States Patent Office

2,983,718
POLYMERIZATION OF ACRYLONITRILE

Marvin Wishman, White Plains, N.Y., and Witold R. Kocay, Stamford, Conn., assignors to American Cyanamid Company, New York, N.Y., a corporation of Maine No Drawing. Filed Apr. 1, 1959, Ser. No. 803,369

6 Claims. (Cl. 260—80.5)

This invention relates to an improvement in the addition polymerization under aqueous conditions of polymerizable matter containing a major proportion of acrylonitrile in the presence of an oxidation-reduction catalyst system comprising chloric acid and sulfurous acid. More specifically, this invention relates to improving the filterability of a polymer product of said polymerizable matter through the addition of trichloroacetic acid.

It has been found in the production of polymers and copolymers of acrylonitrile by the polymerization process as outlined in U.S. Patent No. 2,751,374 to Cresswell and in our copending application Serial No. 711,136, filed January 27, 1958, that the product is obtained in such small aggregates that it is very difficult and sometimes impossible to isolate it from the polymerization medium. The polymerization is usually carried out in a reactor, and the reaction mass is subsequently passed through a filter in order to separate the product. In the process as described in the above U.S. patent and copending application, if the monomer concentration is not kept sufficiently high, the product fails to conglomerate or flocculate sufficiently and it passes directly through the filter. Keeping the concentration of reactant monomers sufficiently high makes the reaction mass exceptionally viscous and it is therefore very difficult to handle. Furthermore, this unfilterable polymer is very fine and when an attempt is made to separate it by centrifuging, it packs like clay and is very difficult to redissolve.

It has been found surprisingly and unexpectedly that when a small amount of trichloroacetic acid is incorporated in the reaction mass that the resulting polymer precipitates in a physical form to yield flocs or aggregates which can be filtered very easily. Not only is the product very filterable when trichloroacetic acid is added to a standard polymerization mixture, but it is found to be operative when very dilute concentrations of reactants are polymerized. The fact that the product manifests improved filterability when trichloroacetic acid is used with the polymerization mixture is unexpected, since trichloroacetic acid has been used in the prior art to control the pH of similar polymerization processes. In U.S. Patent 2,628,223 trichloroacetic acid is shown to be interchangeable with various other acids such as sulfuric, phosphoric, etc., with no apparent difference in the polymerization products. In fact, trichloroacetic acid conspicuously does not affect the reaction as disclosed in Examples 2–4 and Figure 1 of said patent. Further investigations have found that dichloro- and trifluoroacetic acids are also operative to a certain extent but do not give an improvement which is as pronounced as that from trichloroacetic acid. Not only is there an improvement in the filterability of the product when trichloroacetic acid is used in the polymerization medium but this polymer is also less moisture retentive than polymers which are prepared in the absence of trichloroacetic acid.

The fact that the polymers are less moisture retentive is significant since before they can be dissolved in solvents the polymers must be dried until they contain very little moisture. It has been found that the polymer crumb is substantially insoluble in solvents such as dimethylformamide, dimethyl sulfoxide, etc., when the crumb contains a large amount of moisture. This follows from the fact that water can be used to precipitate the polymers from their solutions with the above-mentioned solvents. By preparing the polymers so that they have less moisture there will be much time saved in not having to dry them as long as before and also in the preparation of solutions thereof since they dissolve much more readily.

The improvement of the present invention is applicable in a polymerization method of the kind broadly described in the first paragraph of this specification, and which can be carried out batchwise, semi-continuously or continuously. A continuous method is preferred. Polymerization can be effected while the polymerizable material (e.g., a single or a plurality of monomers) is dissolved or dispersed (as by emulsification, for example) in an aqueous medium having a pH of 4.0 or less, advantageously from about 2.0 to about 3.6. The reaction mass comprises the polymerizable material, the aforesaid aqueous medium and a redox-polymerization-catalyst system that includes, as essential components, (a) a water-soluble chlorine compound that yields chlorate ions in an aqueous acidic medium and (b) a water-soluble sulfoxy compound that yields oxidizable sulfoxy ions in an aqueous acidic medium. This aqueous acidic medium advantageously comprises an aqueous solution of from 0.1 to 25 mole percent of trichloroacetic acid the remainder of which is a non-oxidizable mineral acid having a dissocation constant greater than $10^{-3}$, e.g., sulfuric, nitric, phosphoric, hydrochloric, or other strong acid.

When the polymerization reaction is carried out continuously, one can, if desired or required, charge additional water to the reactor, separately or with one or another of the various feeds of the aforementioned ingredients, so that a desired concentration of materials in the aqueous medium is maintained in the reactor. It is usually preferable to limit the amount of water so that the total weight of polymerizable monomers is between about 15% and 50% of the total material charged during the polymerization reaction. This is especially true when the polymerizable material comprises a substantial amount of acrylonitrile, since the resulting suspension of polymer then has excellent pumping characteristics, as well as outstanding drainage or filtering qualities. Additional economies are, of course, realized in that a small volume of the reaction mass is processed and handled. No difficulties are encountered with respect to separation of polymerizable material, since the polymerizable ingredient or ingredients are charged at a rate which is correlated with the rate of polymerization in such a manner that separation of polymerizable material, specifically monomeric material, does not occur.

In the redox-polymerization-catalyst system employed, the amount of chlorate ions introduced to the reaction mass (reactor) generally will be between about 0.1% and about 2.0% of the weight of the polymerizable monomeric material, and the oxidizable ions, specifically sulfoxy ions, will be present in a quantity ranging between about 0.1% to about 6% by weight on the same basis. Larger amounts of the catalyst components, e.g., 3 or more percent of chlorate ions and 9 or more percent of sulfoxy ions, are operative, but appear to provide no additional benefits. When the oxidizing and reducing components are present in oxidation and reduction equivalents, then in the case of the preferred oxidizable component, 3 moles of the sulfurous acid or a sulfite react per mole of chloric acid or a chlorate. The ratio is the same for bisulfites, but only 1.5 moles of a metabisulfite are required, since such salts ionize to form $HSO_3^-$ ions.

In the redox-polymerization-catalyst system used in practicing the present invention, any water-soluble chlorine compound that yields chlorate ions in an aqueous acidic medium can be used, for instance: chloric acid, ammonium and the various alkali-metal (sodium, potassium, lithium, etc.) chlorates; and the various water-soluble, alkaline-earth metal and heavy metal chlorates.

Illustrative examples of reducing agents that can be employed are sulfites, bisulfites and meta-bisulfites corresponding to the chlorates named in the preceding paragraph, sulfur dioxide, and diethyl and other water-soluble dialkyl sulfites.

By the term "sulfite ions" as used herein and in the appended claims is intended to be included the various sulfoxy species, more particularly $H_2SO_3$ and/or $HSO_3^-$ and $SO_3^\equiv$, the proportionate amounts of these species being a function of pH. We believe that the active component is probably the $H_2SO_3$ molecule.

Relatively low polymerization temperatures, for example, temperatures ranging from about 20° C. to about 70° C. are desirable. Particularly good results are generally obtained when the temperature of polymerization is maintained within the range of from about 35° C. to about 65° C.

It is desirable to conduct the process of the present invention in the absence of oxygen, which has a definite inhibiting effect on the polymerization reaction. Suitable inert gases, such as nitrogen and carbon dioxide, may be used to displace air in the reaction zone.

In practicing the present invention to produce fiber-forming (fiber-formable) acrylonitrile copolymers, the monomeric material generally comprises more than 50%, more particularly at least 70% by weight of acrylonitrile, e.g., 100% acrylonitrile; or more than 50% by weight of acrylonitrile while the remainder is constituted of at least one other different compound which is copolymerizable with acrylonitrile and which contains a $CH_2=C<$. Thus, in addition to acrylonitrile, the polymerizable material may include a plurality of different compounds which are copolymerizable with acrylonitrile and each one of which contains a $CH_2=CH-$ grouping, at least one of said compounds being a vinyl pyridine. The present invention provides good results in preparing a copolymer of monomeric material comprising at least 80% by weight of acrylonitrile, from 2 to 15% by weight of a vinyl pyridine, and from 2 to 15% by weight of vinyl acetate, methyl acrylate, acrylamide, methacrylamide, acrylic acid, methacrylic acid, methacrylonitrile, or the like.

Illustrative examples of vinyl pyridines that can be copolymerized with acrylonitrile, alone or with one or more other copolymerizable monomers, by the method of the present invention, include vinyl pyridines represented by the formula

I

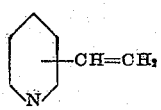

and which include 2-vinyl pyridine, 3-vinyl pyridine, and 4-vinyl pyridine; methyl vinyl pyridines represented by the formula

II

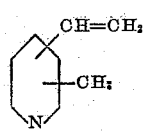

and which include 2-methyl-3-vinylpyridine, 2-methyl-5-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine, and 3-methyl-4-vinylpyridine. The vinylpyridines embraced by Formula II are a preferred subgroup within a broader class of vinylpyridines that are advantageously employed in continuously making dyeable, fiber-forming binary and ternary polymers in accordance with the instant invention and which may be represented by the formula

III

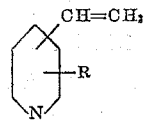

wherein R represents a lower alkyl radical, more particularly a methyl, ethyl, propyl (including n-propyl and isopropyl) or butyl (including n-butyl, isobutyl, sec.-butyl and tert.-butyl) radical. Other examples include the 2- and 4-vinylquinolines, the various vinyl isoquinolines, 2-vinyl-4,6-dimethylpyridine, 2-vinyl-4,6-diethylpyridine, and others embraced by the formula

IV

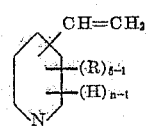

where R represents a lower alkyl radical, examples of which have been given hereinbefore, and $n$ represents an integer from 1 to 5, inclusive.

In order that those skilled in the art may better understand how the present invention can be carried into effect, the following examples are given by way of illustration and not by way of limitation. All parts and percentages are by weight unless otherwise stated.

*Example 1*

One hundred and fifty-two (152) parts (2.87 moles) of acrylonitrile, 9 parts (0.093 mole) of methyl acrylate, 1.23 parts (0.0336 mole) of hydrogen chloride and 1839 parts of deionized water are charged into a round-bottomed flask. The flask is placed in a constant-temperature bath, and a condenser, thermometer, stirrer, nitrogen-inlet tube, and dropping funnel are attached. The mixture, which contains about 8% by weight of polymerizable monomers, is heated at 40° C. under nitrogen for one hour. The catalyst, 0.644 part (0.00512 mole) of sodium chlorate and 6.45 parts (0.0512 mole) of sodium sulfite, is dissolved in 150 cc. of water into the dropping funnel. Forty (40) percent of the catalyst, 60 cc. of solution, is rapidly added to the reaction vessel. After 25 minutes, an additional 22.5 cc. of catalyst solution is added. The remaining catalyst solution is added at 25-minute intervals in volumes of 22.5, 15, 15, 7.5 and 7.5 cc. Catalyst addition is complete in 2.5 hours. The mixture is agitated 1.5 hours longer and the polymer is collected by filtration. Conversion of monomer to polymer is 51% of theory. The polymer has an average molecular weight of 69,000. The average size of the particles in the polymer slurry is 0.75 to 2 cm. when viewed at 10 × magnification.

B. The above example is repeated, except that 1.10 parts (0.0302 mole) of hydrogen chloride and 0.56 part (0.0034 mole) of trichloroacetic acid are used instead of 1.23 parts of hydrogen chloride. Conversion of monomer to polymer is 49 percent of theory. The polymer has an average molecular weight of 73,000. The particle size of the polymer formed is larger than that formed in (A).

C. The A portion of this example is again repeated except that 0.95 part (0.0268 mole) of hydrogen chloride and 1.12 parts (0.0068 mole) of trichloroacetic acid are used instead of 1.23 parts of hydrogen chloride. Conversion of monomer to polymer is 50 percent of theory. The polymer has an average molecular weight of 72,000. The particle size, although non-uniform, is larger than that formed in (B).

We have also conducted tests as in (1B) except that dichloroacetic acid was used rather than trichloroacetic acid. Filterability and crumb properties were similar to those of Example 1A, rather than (1B). We have also carried out tests as in (1C) except that dichloroacetic acid was used rather than trichloroacetic acid. Filterability and crumb properties were similar to those of Example 1A. We have also conducted tests as in (1B) except that trifluoroacetic acid was used rather than trichloroacetic acid. Filterability and crumb properties were similar to those of Example 1A.

*Example 2*

A. A round-bottomed flask is charged with one hundred and thirty-six (136) parts (2.57 moles) of acrylonitrile, 12 parts (0.14 mole) of vinyl acetate, 12 parts (0.10 mole) of 2-methyl-5-vinylpyridine, 4.02 parts (0.11 mole) of hydrogen chloride, and 1430 parts of deionized water, making a suspension containing about 10% by weight of polymerizable monomers. The apparatus is assembled as in Example 1. The catalyst, 0.660 part (0.0062 mole) of sodium chlorate and 2.358 parts (0.0187 mole) of sodium sulfite, is dissolved in 150 cc. of water into a dropping funnel. Polymerization is conducted as in Example 1. Conversion of monomer to polymer is 68% of theory. The polymer has an average molecular weight of 58,000. The reaction mixture filters slowly, yielding a polymer crumb of small particle size. Plating on the sides of the flask is heavy and difficult to remove. The moisture content of the isolated polymer crumb is 69% after drying 24 hours in air.

B. The above example is repeated except that 3.785 parts (0.1038 mole) of hydrogen chloride and 1.016 parts (0.0062 mole) of trichloroacetic acid are used instead of 4.02 parts (0.11 mole) of hydrogen chloride. Conversion of monomer to polymer is 66 percent of theory. The polymer has an average molecular weight of 57,000. The reaction mixture filters very well.

Microscopic examination to compare samples of (2A) and (2B) indicates that the aggregate size of (B) is much larger than that of (A). The moisture content of the isolated polymer crumb is 62% after drying 24 hours in air.

C. The A portion of this example is again repeated except that 3.34 parts (0.0914 mole) of hydrogen chloride and 3.06 parts (0.0186 mole) of trichloroacetic acid are used instead of 4.02 parts (0.11 mole) of hydrogen chloride. Conversion of monomer to polymer is 70 percent of theory. The polymer has an average molecular weight of 61,000. The product can be readily filtered and is easily removed from the sides of the reaction vessel. The moisture content of the isolated polymer crumb is 2% after drying 24 hours in air.

Examples 2B and 2C are repeated except that trifluoroacetic acid is used rather than trichloroacetic acid. The particle size is improved in each case when compared with (1A). However, the increases in particle size are smaller than those found for (2A) and (2B).

Examples 2B and 2C are again repeated using dichloroacetic acid rather than trichloroacetic acid. While there is some improvement over (1A) these results are inferior to those obtained with trifluoroacetic acid and much poorer than those obtained in Examples 2B and 2C with trichloroacetic acid.

*Example 3*

A. One hundred and forty-four (144) parts (2.72 moles) of acrylonitrile, 8 parts (0.093 mole) of vinyl acetate, 8 parts (0.076 mole) of 4-vinylpyridine, 3.33 parts (0.0912 mole) of hydrogen chloride and 980 parts of deionized water are charged into a round-bottomed flask. The apparatus is assembled as in Example 1. The catalyst, 0.594 part (0.0056 mole) of sodium chlorate and 2.82 parts (0.0224 mole) of sodium sulfite, is dissolved in 150 cc. of water into a dropping funnel. Polymerization is conducted as in Example 1. Conversion of monomer to polymer is 51% of theory. The polymer has an average molecular weight of 59,000. The crumb is easily separated from the mother liquor. The particle size is quite uniform and extremely small. The final crumb has a moisture content of 76 percent after 24 hours in air.

B. The above example is repeated except that 3.00 parts (0.0823 mole) of hydrogen chloride and 1.46 parts (0.0089 mole) of trichloroacetic acid are used instead of 3.33 parts (0.0912 mole) of hydrogen chloride. Conversion of monomer to polymer is 48 percent of theory. The polymer has an average molecular weight of 63,000. The particle size is uniform and larger than that found in (A). The moisture content of the final polymer crumb is 60 percent after 24 hours in air.

We claim:

1. The process which comprises polymerizing, at a temperature within the range of from about 20° C. to about 70° C. and in an aqueous acidic medium having a content of polymerizable monomers not greater than about 50% and a pH of not more than 4.0, polymerizable matter selected from the group consisting of (1) acrylonitrile and (2) mixtures containing more than 50% by weight of acrylonitrile the balance being at least one other different compound which is copolymerizable with acrylonitrile and which contains a $CH_2=C<$ grouping with the aid of an oxidation-reduction catalyst system comprising chlorate ions and sulfite ions, the amount of chlorate ions being between about 0.1 percent and about 3 percent of the weight of the said polymerizable matter and the amount of the sulfite ions being between about 0.1 percent and about 9 percent of the said polymerizable matter, the acid component of the said aqueous acidic medium consisting of from 0.1 to 25 mole percent of trichloracetic acid and from 75 to 99.9 mole percent of a non-oxidizable mineral acid having a dissociation constant greater than $10^{-3}$; and isolating the resulting polymer from the reaction mass by means including filtration, said trichloroacetic acid improving the filterability of the said polymer.

2. The process as set forth in claim 1 wherein the polymerizable matter comprises a major portion of acrylonitrile and a minor portion of methyl acrylate.

3. The process as set forth in claim 1 wherein the polymerizable matter comprises a major portion of acrylonitrile and a minor portion composed of vinyl acetate and an alkyl-substituted vinylpyridine.

4. The process as set forth in claim 3 wherein the alkyl-substituted vinylpyridine is 2-methyl-5-vinylpyridine.

5. The process as set forth in claim 3 wherein the major portion comprises about 136 parts by weight acrylonitrile and the minor portion comprises about 12 parts by weight vinyl acetate and about 12 parts by weight 2-methyl-5-vinylpyridine.

6. The process as set forth in claim 1 wherein the polymerizable matter is acrylonitrile.

References Cited in the file of this patent

UNITED STATES PATENTS

| | | |
|---|---|---|
| 2,628,223 | Richards | Feb. 10, 1953 |
| 2,751,374 | Cresswell | June 19, 1956 |
| 2,769,793 | Ham | Nov. 6, 1956 |